(12) United States Patent
Stepniak et al.

(10) Patent No.: US 7,980,976 B2
(45) Date of Patent: Jul. 19, 2011

(54) TIMING BELT TENSIONER

(75) Inventors: Jacek Stepniak, Innisfil (CA); Jorma J. Lehtovaara, Mississauga (CA); Marek Frankowski, Innisfil (CA)

(73) Assignee: Litens Automotive Inc., Woodbridge (CA)

( * ) Notice: Subject to any disclaimer, the term of this patent is extended or adjusted under 35 U.S.C. 154(b) by 144 days.

(21) Appl. No.: 11/813,463

(22) PCT Filed: Jan. 18, 2006

(86) PCT No.: PCT/CA2006/000057
§ 371 (c)(1),
(2), (4) Date: Jul. 6, 2007

(87) PCT Pub. No.: WO2006/076799
PCT Pub. Date: Jul. 27, 2006

(65) Prior Publication Data
US 2008/0139353 A1    Jun. 12, 2008

(51) Int. Cl.
*F16H 7/10* (2006.01)

(52) U.S. Cl. ........ 474/112; 474/101; 474/109; 474/133; 474/135; 474/199; 384/215

(58) Field of Classification Search .................. 474/112, 474/237, 111, 135
See application file for complete search history.

(56) References Cited

U.S. PATENT DOCUMENTS

| | | | |
|---|---|---|---|
| 4,583,962 A | 4/1986 | Bytzek et al. | |
| 4,713,045 A * | 12/1987 | Kodama et al. | 474/135 |
| 4,767,383 A * | 8/1988 | St. John | 474/133 |
| 4,917,655 A | 4/1990 | Martin | |
| 4,923,435 A | 5/1990 | Kadota et al. | |
| 5,064,405 A | 11/1991 | St. John | |
| 5,078,656 A | 1/1992 | Brandenstein et al. | |
| 5,244,438 A | 9/1993 | Golovatai-Schmidt | |
| 5,370,585 A * | 12/1994 | Thomey et al. | 474/112 |
| 5,470,279 A * | 11/1995 | Brandenstein et al. | 474/135 |
| 5,919,107 A * | 7/1999 | Stepniak | 474/112 |
| 6,149,542 A | 11/2000 | Lehtovaara | |
| 6,375,588 B1 | 4/2002 | Frankowski et al. | |
| 6,422,962 B1 | 7/2002 | Lehtovaara et al. | |
| 6,659,896 B1 | 12/2003 | Stief et al. | |

(Continued)

FOREIGN PATENT DOCUMENTS

CA    2469497    6/2003

(Continued)

*Primary Examiner* — Robert Siconolfi
*Assistant Examiner* — San Aung

(57) ABSTRACT

A tensioner for tensioning a flexible drive means, such as a timing belt or chain, includes a pulley to contact the belt. The pulley is mounted on a tensioner arm and the tensioner arm can be rotated about a pivot shaft mounted to the tensioner by a spring. The axis about which the pulley rotates is spaced from the axis of the rotation of the tensioner arm with respect to the pivot shaft and the spacing of these axes of rotation results in the pulley moving through an eccentric towards or away from the belt when the tensioner arm is rotated. A stop is used to limit the range of movement of the tensioner arm between a desired range of movement defined by a free arm stop and a backstop. The position of the stop is adjustable by an installer. The angular range of movement of the tensioner arm is adjustable from a position suitable for installation of the tensioner to a position suitable for operation of the installed tensioner. In one embodiment, the movement of the stop from the installation position to the nominal operating position also compensates the spring.

20 Claims, 6 Drawing Sheets

U.S. PATENT DOCUMENTS

| | | |
|---|---|---|
| 6,699,149 B1 | 3/2004 | White et al. |
| 2003/0017894 A1 | 1/2003 | Kaiser et al. |
| 2004/0180745 A1* | 9/2004 | Dinca et al. .................. 474/135 |
| 2006/0035740 A1 | 2/2006 | Lehtovaara et al. |

FOREIGN PATENT DOCUMENTS

| | | |
|---|---|---|
| DE | 3718227 A1 | 12/1988 |
| DE | 19813586 A1 | 9/1999 |
| EP | 0517185 B1 | 12/1992 |
| EP | 0678685 A1 | 10/1995 |
| EP | 0967412 B1 | 12/1999 |
| WO | WO 02/068841 A2 | 9/2002 |
| WO | WO-03012317 A1 * | 2/2003 |

* cited by examiner

TIMING BELT TENSIONER

FIELD OF THE INVENTION

The present invention relates to a tensioner for tensioning a flexible drive means, such as a timing belt, timing chain or the like, on an engine. More specifically, the present invention relates to a tensioner for a flexible drive means which can be installed on an engine in a relatively easy manner.

BACKGROUND OF THE INVENTION

Tensioners for flexible drive means, such as timing belts, timing chains and the like, are well known in the art. The tensioner includes a rotatable member, typically a roller or pulley, which is biased against the belt to maintain a substantially constant tension in the belt as the engine is operated. The pulley is pivotally mounted to the tensioner at a mounting point which is spaced from the axis about which the pulley rotates to create an eccentric about which the pulley can be moved to tension the belt. The difference between the pivotal mounting point and the axis of rotation for the pulley is typically referred to as the "arm" of the tensioner and a spring or other biasing means biases the pulley towards the belt to tension it.

As the forces applied to the belt by the engine can vary significantly as the engine operates, resulting in significant changes in the tension in the flexible drive member, the biasing force which biases the pulley of the tensioner against the belt must be relatively large. Tensioners thus typically include a spring having a relatively large spring force constant to bias the pulley against the belt.

A consideration in the design of tensioners is the angle, with respect to the arm, at which the belt contacts the pulley. Ideally, the contact force between the belt and the pulley should be orthogonal, or close to orthogonal to the arm to achieve proper tensioning as the effective biasing force created by the spring will vary significantly as the contact force angle approaches an angle where the force is inline with the arm, rather than orthogonal to it.

While the above considerations can be effectively dealt with in the design of the tensioner, it can be difficult to install the resulting tensioner on the engine, as taught by commonly assigned U.S. Pat. No. 5,919,107. Specifically, it can be difficult to mount the tensioner on the engine while positioning the arm of the tensioner to achieve the desired angle between the arm and the contact force between the belt and the pulley and while achieving the necessary preload on biasing spring.

Prior attempts to provide a tensioner which can be installed in a reasonable manner have included commonly assigned U.S. Pat. No. 6,149,542, which provides a tensioner with an operating eccentric and an installation eccentric. The installation eccentric is employed to move the tensioner to a position sufficiently far away from the belt to allow installation and routing of the belt. Once the belt is installed, the tensioner is moved along its installation eccentric to place the tensioner into the operating position after which the tensioner arm can move about the operating eccentric.

Typically, the movement of the tensioner along the installation eccentric during installation requires a two-handed operation on the part of the installer wherein the mounting bolt (or bolts) fastening the tensioner to the engine must be loosened with a first hand while the tensioner is moved through its installation eccentric to the desired operating position with the second hand. Once the desired operating position is obtained, the mounting bolt or bolts are fastened with the first hand while the tensioner is held at the operating position with the second hand. As is apparent, this can be an awkward and/or difficult operation to perform. However, even more problematic is the fact that, as the mounting bolt or bolts of tensioner must be loosened during the setting of the operating position, the tensioner can be tilted with respect to the face of the engine. Any such tilt will result in tensioner being set at an improper operating position which will not be apparent until the tensioner mounting bolt or bolts are tightened. In such a case, the installer must re-perform the installation operation until a correct operating position is obtained.

Prior art attempts to avoid installation difficulties have included tensioners with relatively expensive components such as one way clutch mechanisms in single eccentric long-arm tensioners.

It is desired to have a tensioner which is relatively easy to install and which avoids the need for relatively expensive components.

SUMMARY OF THE INVENTION

It is an object of the present invention to provide a novel tensioner for a belt which obviates or mitigates at least one disadvantage of the prior art.

According to a first aspect of the present invention, there is provided a tensioner for a belt on an engine. The tensioner has a pivot shaft having a central bore to receive a bolt to install the tensioner to the engine. A tensioner arm is rotatably mounted on the pivot shaft and has a cylindrical bearing mounting surface with its center located eccentrically with respect to the center of the pivot shaft. A rotatable member is rotatably mounted to the cylindrical bearing mounting surface. The rotatable member has an outer surface complementary to the surface of belt to be contacted. A spring is operable to bias the tensioner arm about the pivot shaft to move the rotatable member towards the belt to tension the belt. An adjustable stop means receives a stop member of the tensioner arm and defines a range through which the stop member, and thus the tensioner arm, can move during operation of the tensioner. The stop means is moveable by an installer of the tensioner after the tensioner has been installed on the engine to alter the angular position of the range of movement of the tensioner arm from a position suitable for installation of the tensioner to a position suitable for operation of the installed tensioner.

Preferably, the stop means includes indicia to indicate when the tensioner arm and the stop means have been moved to the suitable operating position. In one embodiment, the tensioner includes a base and the spring has one end attached to the tensioner arm and the other end attached to the base.

According to a second embodiment, the spring has one end attached to the tensioner arm and the other end attached to the stop means, such that the tension in the spring is compensated for movement of the tensioner arm, as the stop means is moved.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
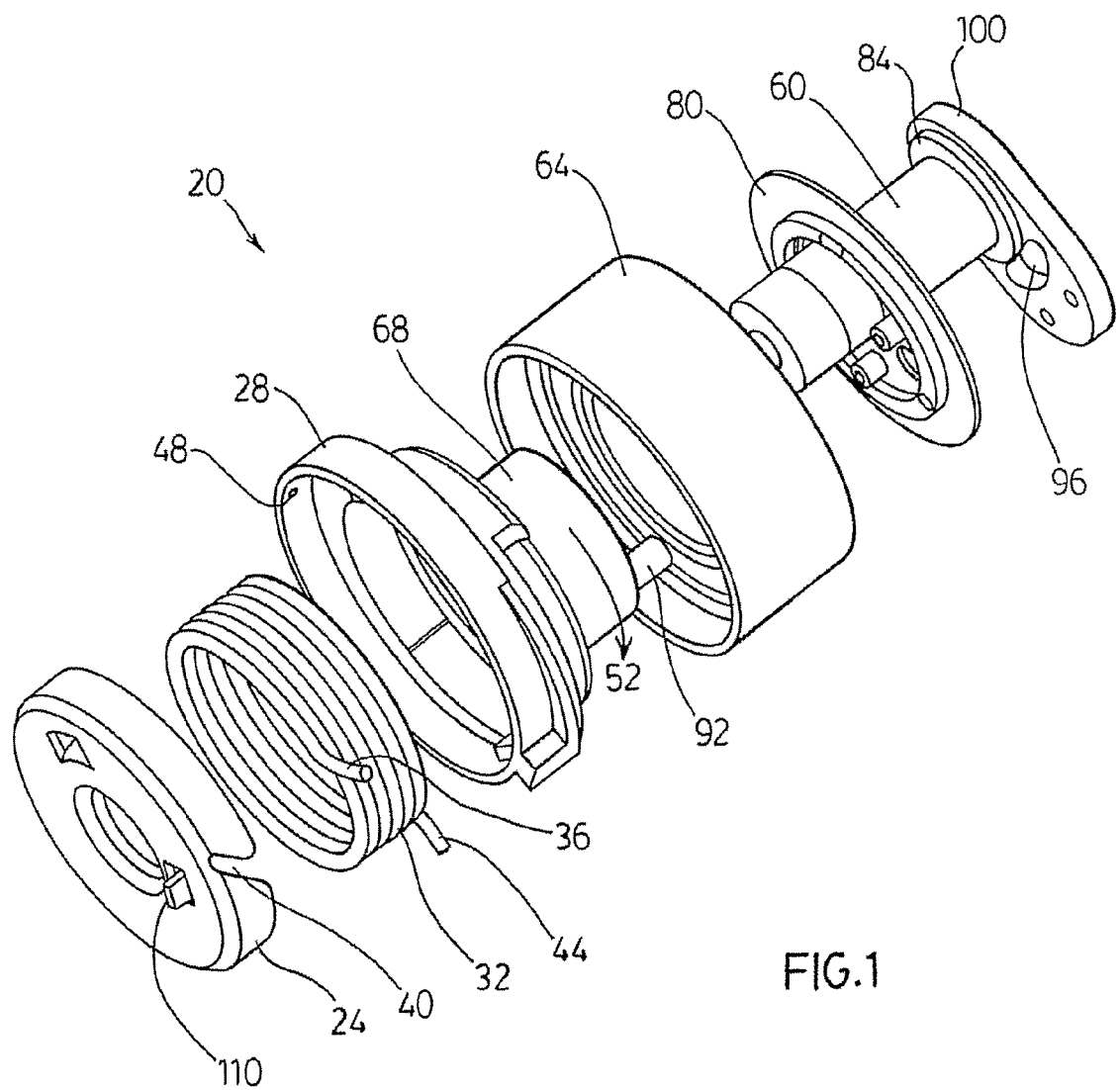
FIG. 1 shows an exploded side perspective view of a tensioner in accordance with the present invention.

A tensioner in accordance with the present invention is indicated generally at 20 in FIG. 1. Tensioner 20 includes a base 24, a tensioner arm 28 and a biasing spring 32 which acts between base 24 and tensioner arm 28. One tang 36 of biasing spring 32 engages a slot 40 in base 24 while the other tang 44 engages a spring slot or hole at the top section of a bore 48 in tensioner arm 28 to bias tensioner arm 28 in the direction shown by arrow 52.

Figure 2:
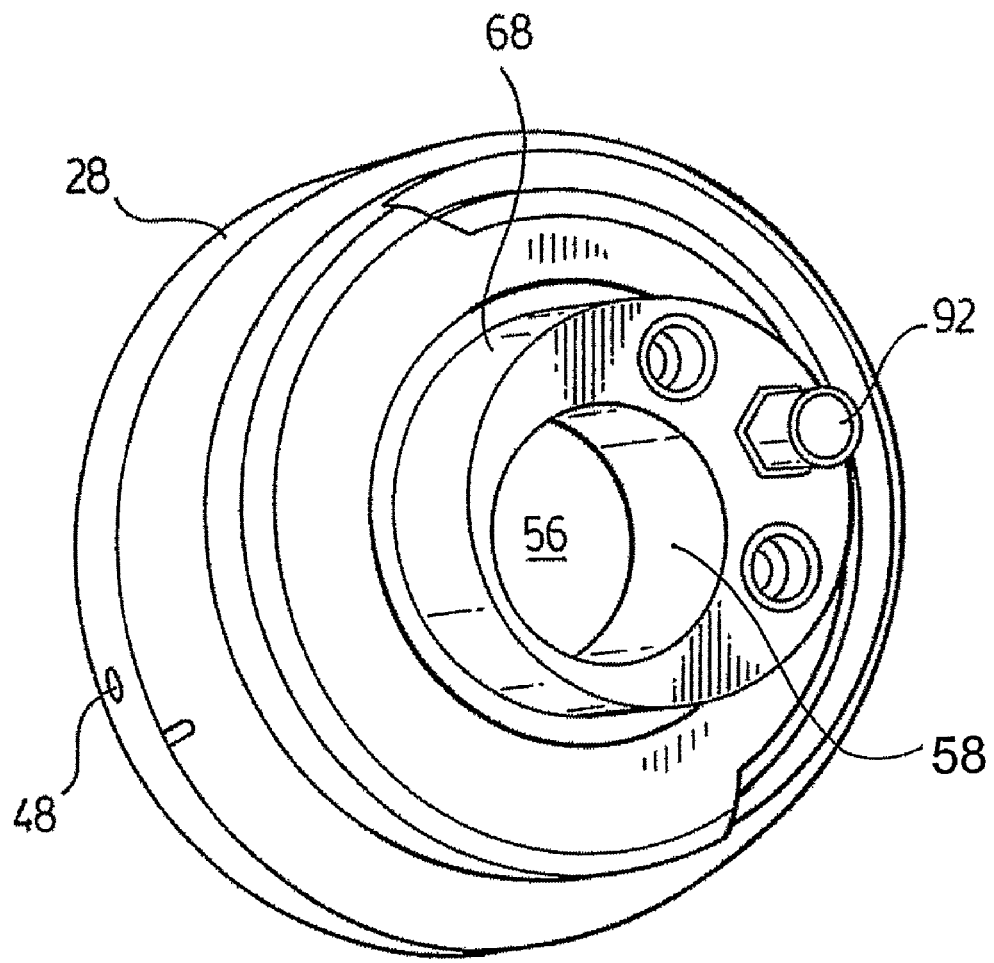
FIG. 2 shows a perspective view of a tensioner arm of the tensioner of FIG. 1.

As best seen in FIG. 2, tensioner arm 28 includes a central bore 56 and a pivot shaft 60. Central bore 56 receives a bushing 58. Pivot shaft 60 has a center bore 62 through which a bolt (not shown) is passed to fasten tensioner 20 to an engine. Bushing 58 allows tensioner arm 28 to rotate about pivot shaft 60.

Tensioner 20 further includes a rotatable member 64 which is designed to engage the flexible drive means to be tensioned. In the embodiment of tensioner 20 illustrated in the Figures, the flexible drive means to be tensioned is a toothed belt and rotatable member 64 is a pulley that features a smooth outer surface which is intended to engage the outer surface of the toothed belt.

However, as will be apparent to those of skill in the art, the present invention is not limited to tensioners to engage the outer (smooth) surface of toothed belts. The present invention can be employed to engage the inner (toothed) surface of a toothed belt, to engage the inner or outer surface of a smooth belt and/or to engage the inner or outer surface of a chain. For each different configuration, tensioner 20 need only have the outer surface of rotatable member 64 shaped in a manner complementary to the particular surface of the particular flexible drive means to be tensioned. For example, if the flexible drive means to be tensioned is a chain drive, the outer surface of rotatable member 64 can be in the form of a sprocket with suitably sized and spaced teeth to engage the chain. Other configurations and shapes for the outer surface of rotatable member 64 will be apparent to those of skill in the art.

Figure 5:
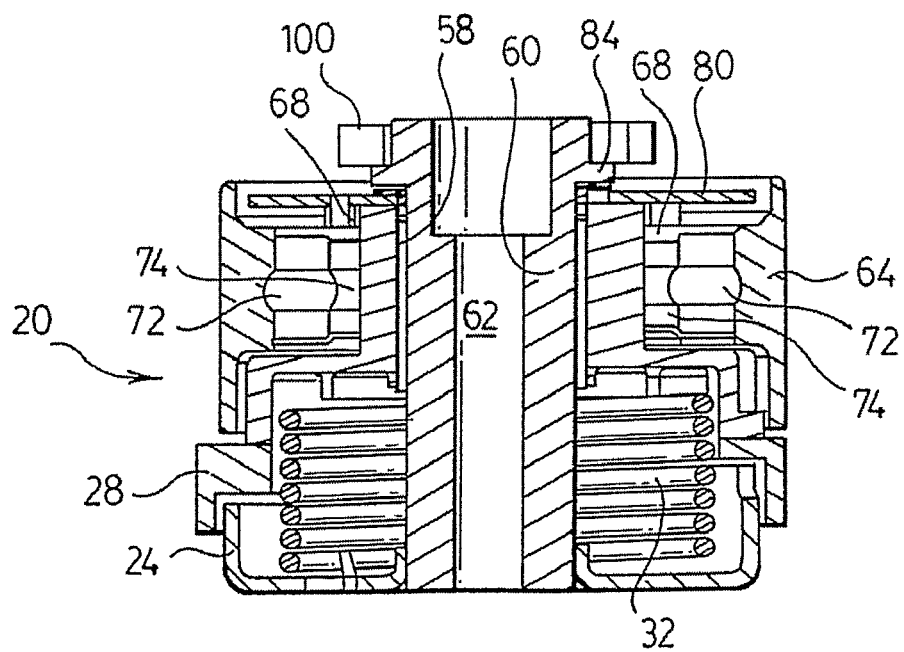
FIG. 5 shows a section taken along line 5-5 of FIG. 4.

In the illustrated embodiment rotatable member 64, best seen in FIG. 5, is a pulley and includes an integral bearing to allow pulley 64 to rotate with respect to tensioner arm 28. Specifically, pulley 64 includes an inner race 74, bearing balls and cages 72 and outer ring which are integrally formed with the above-mentioned smooth outer pulley surface of pulley 64 which engages the belt. Inner race 74 is fitted on cylindrical bearing mounting surface 68 of tensioner arm 28 thereby allowing the outer pulley surface to rotate about the centre axis 70 of bearing mounting surface 68 of tensioner arm 28.

As will be apparent to those of skill in the art, pulley 64 need not be formed with an integral bearing and, instead, pulley 64 can comprise a pulley and any suitable separate bearing can be provided to act between cylindrical bearing mounting surface 68 and pulley 64.

Figure 3:
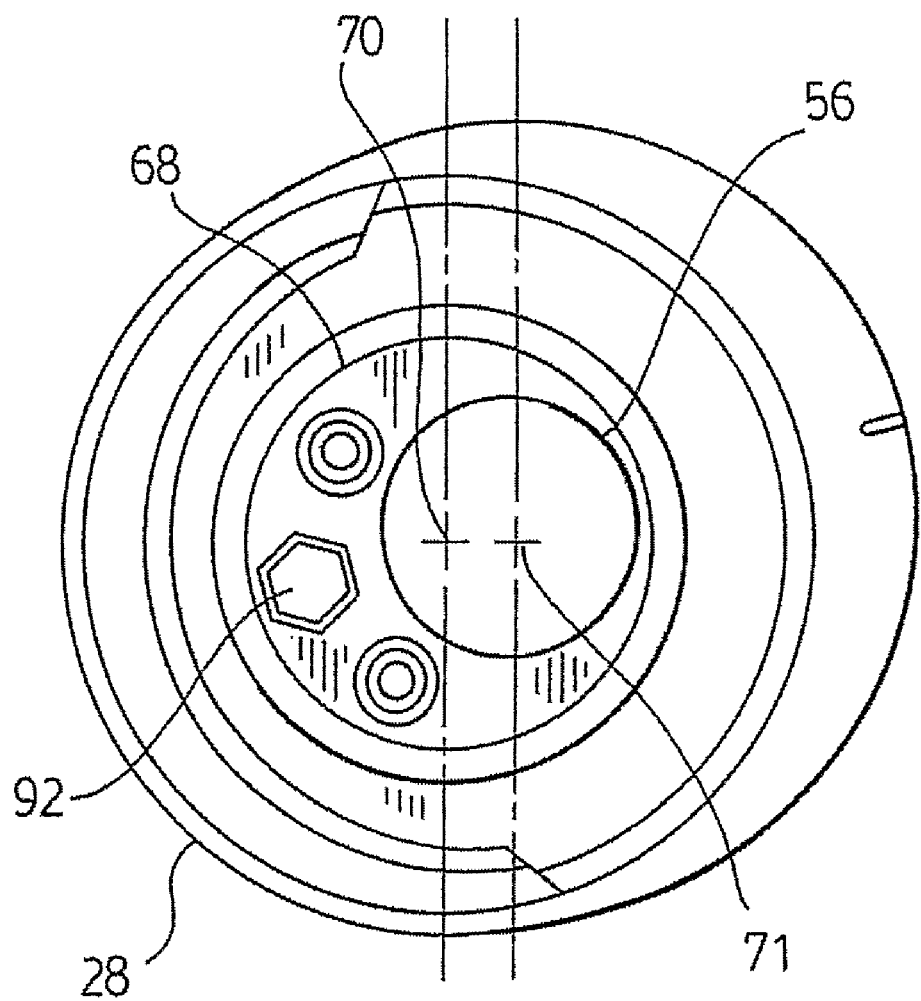
FIG. 3 shows a top view of the tensioner arm of FIG. 2.
Figure 4:
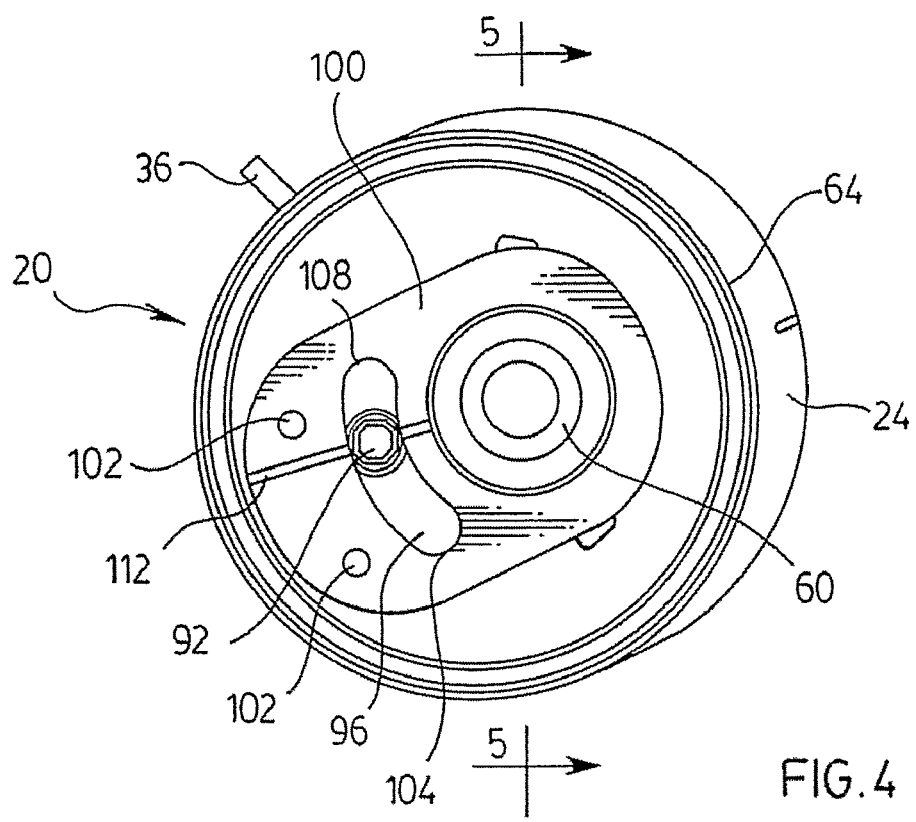
FIG. 4 shows a top view of the assembled tensioner of FIG. 1.

As best seen in FIG. 3, the center axis 70 of bearing mounting surface 68 is spaced or offset from the center axis 71 of center bore 56 such that, as tensioner arm is rotated about pivot shaft 60, bearing mounting surface 68 and pulley 64 will follow an eccentric path with respect to the center axis 71 of center bore 56, thus moving pulley 64 towards or away from the flexible drive member to be tensioned.

A thrust washer 80 is provided between the upper surface of tensioner arm 28 and a flange 84 on pivot shaft 60 to handle axial loads between tensioner arm 28 and pivot shaft 60.

The upper surface of tensioner arm 28 includes a stop pin 92 which extends upward from tensioner arm 28, through thrust washer 80 and engages an arcuate slot 96 in a stop plate 100. The range of the rotation of tensioner arm 28 about pivot shaft 60 is limited by stop pin 92 abutting one or the other end ends of slot 96.

In the illustrated embodiment, end 104 of slot 96 is the "free arm" stop and limits the extent to which pulley 64 can move towards the belt to tension it and end 108 of slot 96 is the "backstop" which limits the extent to which tensioner arm 28 and pulley 64 can move away from the belt (clockwise in the illustrated embodiment) to the point where excessive dynamic vibrations of the drive system, or even tooth skip failure, could occur.

Stop plate 100 frictionally engages pivot shaft 60 with a frictional force such that during installation, as described below, stop plate 100 can be rotated by the installer about pivot shaft 60, overcoming the frictional force, to alter the angular position of stop plate 100 relative to the stationary parts, such as pivot shaft 60 and base 24 of tensioner 20, but the frictional force is sufficient to resist rotation of stop plate 100 about pivot shaft 60 during normal operation of engine it is installed on.

Pivot shaft 60 is connected to, preferably press fit into, base 24 such that sufficient frictional force is developed between base 24 and pivot shaft 60 to prevent rotational movement between pivot shaft 60 and base 24 during handling of the tensioner 20.

In a present embodiment of the invention, stop plate 100 frictionally engages, preferably by press fit, pivot shaft 60 to obtain an interference fit therebetween. The resulting frictional force produced between stop plate 100 and pivot shaft 60 is sufficiently large that the expected operating loads on tensioner arm 28 are insufficient to rotate stop plate 100 about pivot shaft 60. However, the resulting frictional force can be overcome by the installer of tensioner 20, by attaching a wrench or other tool to stop plate 100 and exerting force on stop plate 100 thereby.

It is contemplated that in some circumstances it may be desired to employ friction enhancers (such as Locktite™ or any other suitable material) between stop plate 100 and pivot shaft 60.

A pair of tool holes 102 is provided in stop plate 100 to allow a tool with a complementary set of pins to engage tool holes 102 to rotate stop plate 100 as desired. As will be apparent to those of skill in the art, the present invention is not limited to the use of such a two-pin tool and any other suitable means by which an installer can rotate stop plate 100 can be employed.

When tensioner 20 is assembled at the factory, stop plate 100 can be rotationally positioned on pivot shaft 60 placing the tensioner in an install condition, such that stop pin 92 abuts end 104 (due to the biasing of spring 32) of slot 96 positioning tensioner arm 28 and pulley 64 to have a minimum amount of offset relative to the base 24. In this condition, the pulley can be positioned as far away from the expected position of the flexible belt as possible, enabling easy training of the belt about the pulley 64. This allows tensioner 20 to be installed on an engine, with pulley 64 being free of the belt, by inserting a bolt through central bore 62 of pivot shaft 60 and torquing the bolt to a specified value. An index tab 110 extends from the bottom of base 24 and engages a complementary slot of groove on the engine to properly position tensioner 20 in a correct angular position on the engine.

Once tensioner 20 is fastened to the engine and the belt has been properly routed over all other elements of the drive system, the installer of tensioner 20 rotates stop plate 100 (clockwise in the illustrated embodiment) which allows spring 32 to rotate tensioner arm 28 about bushing 58 to move pulley 64 towards the belt.

As pulley 64 contacts the belt, the installer continues rotating stop plate 100 and end 104 of slot 96 moves away from stop pin 92 as the belt prevents further rotation of tensioner arm 28 and stop pin 92. The installer continues to rotate stop plate 100 until stop pin 92 is aligned with indicia 112 provided on stop plate 100. Indicia 112, which can be a scored line, painted indicator or any other suitable indicia, is located at a predetermined position along slot 96 wherein tensioner arm 28 and pulley 64 are in a nominal position where ends 104 and 108 provide appropriate stops for the desired range of movement of tensioner arm 28 and pulley 64 during operation of the engine. The position of indicia 112 along slot 96 is predetermined at the factory, using well known techniques, for each different engine on which tensioner 20 is to be installed. At this nominal operating position the pulley can move towards, or away from, the belt within a range that is limited to the expected operating needs of the belt.

In many prior art tensioners, the tensioner could only be moved from an installation position to an operating position prior to the mounting bolts being torqued to the required fastening values, thus leading to the possible mis-adjustment of the tensioner due to a tilt of the tensioner with respect to the belt. In contrast, tensioner 20 is adjusted from the installation position to the operating position after tensioner 20 is completely mounted to the engine, with the mounting bolt torqued to the final value.

Further, unlike many prior art tensioners, adjustment of tensioner 20 is a one-handed operation, only requiring the rotation of stop plate 100, with an amount of mechanical advantage via an appropriate tool, and is thus simpler and faster to perform that prior art tensioners that required the installer to simultaneously manipulate an operating range setting bolt and a mounting bolt.

Thus, unlike prior art tensioners, tensioner 20 can be simply and accurately installed without requiring expensive or complex components, such as one way clutches or the like.

Figure 6:
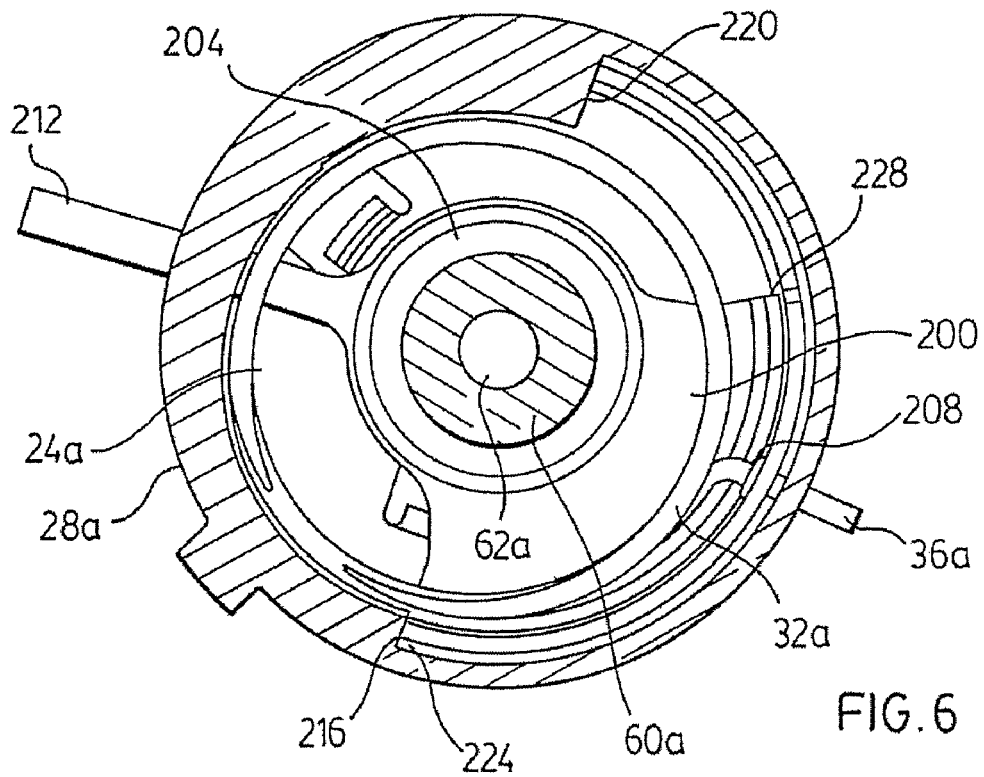
FIG. 6 shows a top section of a base and stop plate of another embodiment of the present invention, with the stop plate in an installation position.
Figure 7:
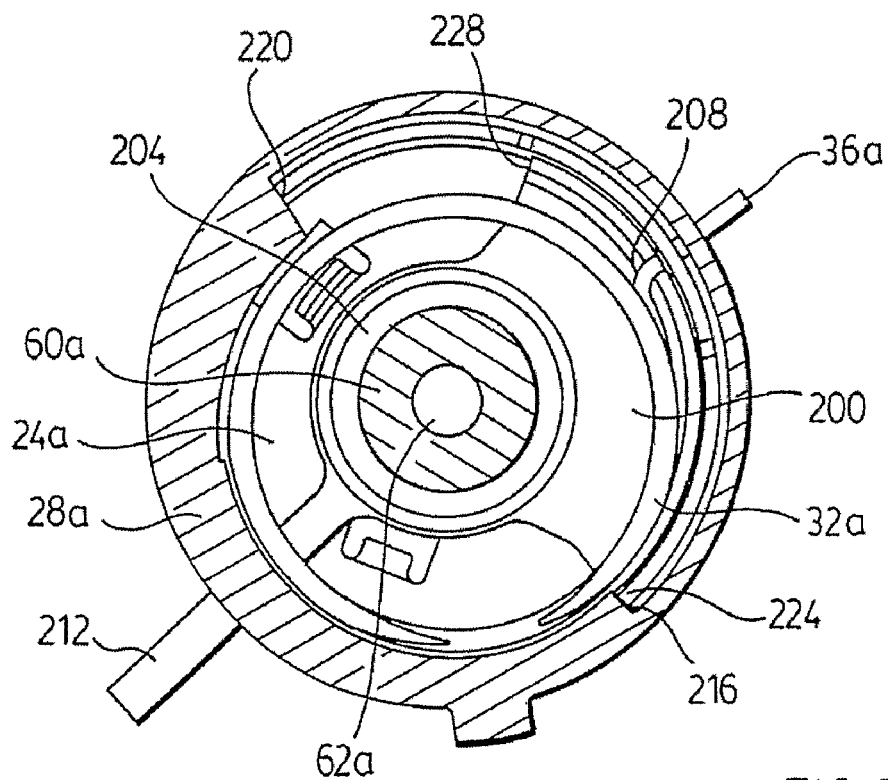
FIG. 7 shows the base and stop plate of FIG. 6 with the stop plate in a position wherein the tensioner is just contacting the belt.
Figure 8:
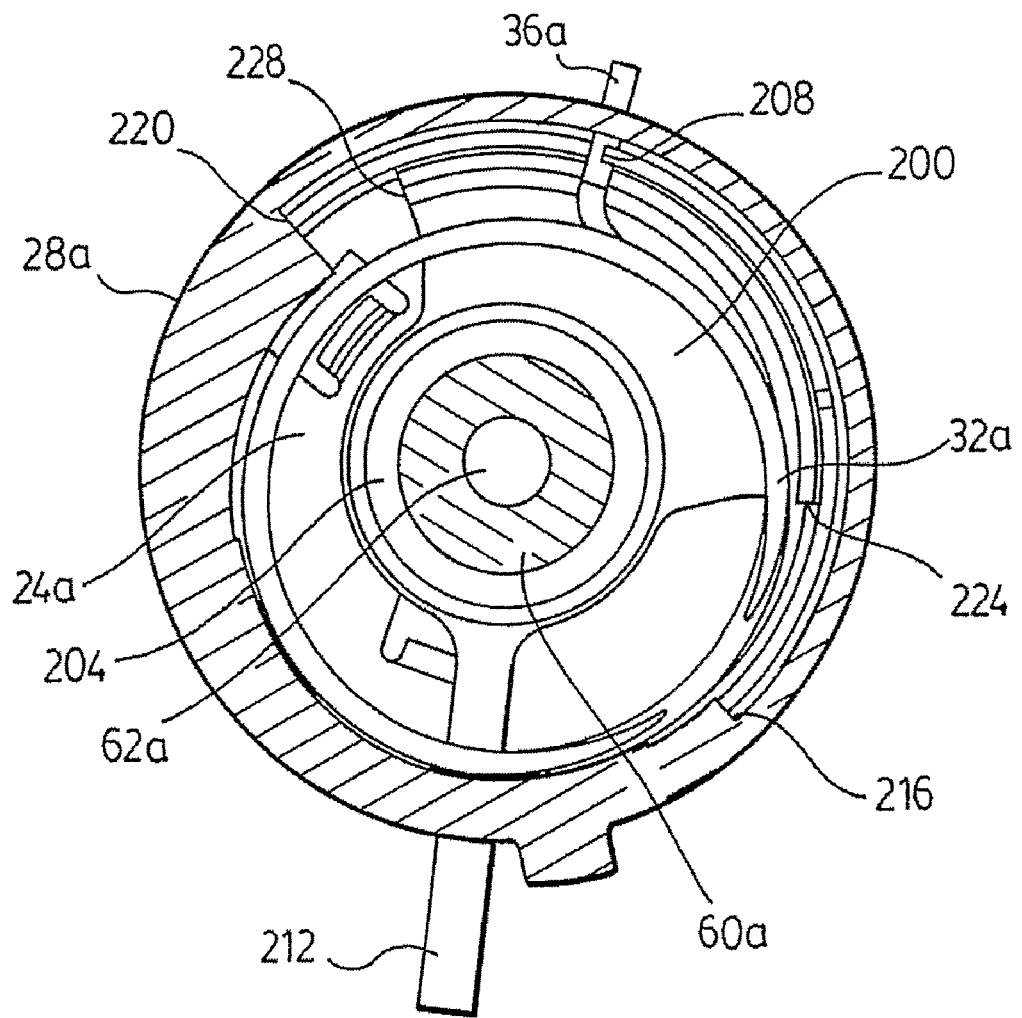
FIG. 8 shows the base and stop plate of FIG. 6 with the stop plate in a nominal operating position.

Another embodiment of the present invention is illustrated in FIGS. 6 through 8. While tensioner 20 provides several advantages over prior art tensioners, if the range of movement of tensioner arm 28 between the installation position and the operating position is relatively large, it can be difficult to size spring 32 to provide the desired degree of control of the force being applied to the belt. This is due to the fact that the spring force of spring 32 is not constant, as it changes somewhat as spring 32 is wound and unwound. Accordingly, if spring 32 is wound and unwound to a relatively large extent as tensioner 20 is moved between the installation and operating positions, it can be difficult to ensure that spring 32 is properly tensioned to create the desired biasing force on tensioner arm 28.

In the embodiment of FIGS. 6 through 8, wherein like components to those of the embodiment shown in FIGS. 1 through 5 are indicated with like reference numerals with an "a" appended. FIGS. 6 through 8 show the assembly of a different base 24a and stop plate 200 which is used with the remainder of the components of tensioner 20, described above, wherein stop plate 100 and stop pin 92 are supplanted by the illustrated assembly. In this embodiment, the tension of spring 32a remains relatively constant as tensioner arm 28 is moved between the installation position and the operating position.

Specifically, FIG. 6 shows a base 24a which includes a stop plate 200. In the illustrated embodiment, stop plate 200 is press fit to a central upraised cylindrical boss 204 to form an interference fit which produces a frictional force between stop plate 200 and boss 204 to inhibit rotation of stop plate 200 about boss 204. As was the case with the embodiment discussed above, it is contemplated that in some circumstances it may be desired to employ friction enhancers between stop plate 200 and boss 204. Pivot shaft 60 is received in the interior of boss 204.

As will be apparent to those of skill in the art, stop plate 200 can be frictionally mounted to base 24a in a variety of manners and the present invention is not limited to the attachment of stop plate 200 via a cylindrical boss 204. It is also contemplated that stop plate 200 can be directly attached to pivot shaft 60, rather than to base 24a.

Stop plate 200 includes a slot 208 which receives tang 36a of spring 32a and base 24a includes a elongated slot in its outer wall through which tang 36a extends and which allows tang 36a to be rotated with stop plate 200, as described below. Stop plate 200 further includes a feature to allow the installer to rotate stop plate 200 during the installation process. In the illustrated embodiment, this feature is in the form of an adjustment arm 212 which extends outwardly through another slot in the exterior wall of base 24a but the present invention is not limited to such an adjustment arm 212 and any other suitable mechanism for rotating stop plate 212, as will occur to those of skill in the art, can be employed.

Tensioner arm 28a includes a free arm stop 216 and a backstop 220 and stop plate 200 includes abutment surfaces 224 and 228 which can abut, respectively, free arm stop 216 and backstop 220, as described below.

As will be apparent, tensioner 20 is assembled at the factory with stop plate 200 in an installation position, as illustrated in FIG. 6. In this position, free arm stop 216 abuts abutment surface 224 and tensioner arm 28a will be in its installation position being located at the farthest distance from the belt to allow for installation. As was the case with the previous embodiment, tensioner 20 is mounted to the engine with a bolt through the central bore 62a of pivot shaft 60a and the bolt is torqued to a specified value.

Once tensioner 20 has been properly mounted to the engine, the installer moves adjustment arm 212 in a counter-clockwise direction (in the illustrated configuration) using any suitable tool, moving stop plate 200 to the position illustrated in FIG. 7 where tensioner arm 28a, together with pulley 64 (not shown) are moved towards the belt until pulley 64 contacts the belt. The frictional force between stop plate 200 and boss 204 is large enough to inhibit rotation of stop plate 200 during normal operation of tensioner 20 but can be overcome by the installer during installation.

The installer continues to move adjustment arm 212 in a counterclockwise direction until adjustment arm 212 is aligned with an indicia (not shown) on tensioner arm 28a which indicates that tensioner arm 28a is in its nominal operating position, illustrated in FIG. 8. As shown in FIG. 8, abutment surfaces 224 and 228 are located at about the midpoint between free arm stop 216 and backstop 220. As will be apparent, the installation and setting of this embodiment of tensioner 20 is quite similar to that of the embodiment described with respect to FIGS. 1 through 5.

However, unlike the embodiment of FIGS. 1 through 5, in the embodiment illustrated in FIGS. 6 through 8, tang 36a of spring 32a moves together with stop plate 200 thus compensating for the fact that spring tang 44*a*, attached to tensioner arm 28*a*, is also rotated counterclockwise during the installation process. As will be apparent to those of skill in the art, while the provision of this compensation is presently preferred, it is not necessary and the embodiment of FIGS. 6 through 8 can have spring tang 36*a* attached to base 24*a*. For example, in the case that spring tang 36*a* is attached to stop plate 200, it is possible to omit base 24*a* from tensioner 20*a* and to frictionally connect stop plate 200 to pivot shaft 60*a*. In this case, it is preferable, but not absolutely necessary, to provide a feature on stop plate 200 to allow the installer to align tensioner 20 to the correct angular installation position prior to tightening the mounting bolt.

In the embodiment of the present invention illustrated in FIGS. 6 through 8, tensioner arm 28*a* and pulley 64 attached to it, are held in an installation position, away from the belt, by stop plate 200. It is contemplated that some engine designs may not provide enough space for adjustment arm 212 to be rotated sufficiently from the installation position to the operating position. In such a case, it is possible to rotate tensioner arm 28*a* so that backstop 220 approaches abutment surface 228 of stop plate 200 and to lock tensioner arm 28*a* in this position by an installation pin (not shown) which prevents relative movement between tensioner arm 28*a* and stop plate 200. Such installation pins are known to those of skill in the art and are employed with various prior art tensioners.

The location of the installation pin on tensioner 20*a* is preferably selected such that it will be easy for the installer to remove the pin after the belt and/or tensioner 20*a* has been installed. As an example, the installation pin could be installed through a hole in tensioner arm 28*a*, similar to hole 48 shown in FIGS. 1 and 2. After going through the hole in the tensioner arm 28*a*, the pin must further engage in a hole or slot-type feature either in stop plate 200 or base 24*a* or both. After removing the installation pin the installer continues the installation process, as described above, by rotating adjustment arm 212 in the same way as previously described.

The above-described embodiments of the invention are intended to be examples of the present invention and alterations and modifications may be effected thereto, by those of skill in the art, without departing from the scope of the invention which is defined solely by the claims appended hereto.

What is claimed is:

1. A tensioner for a flexible drive means on an engine, comprising:
   a pivot shaft having a central bore for receiving a bolt to install the tensioner to the engine;
   a tensioner arm rotatably mounted on the pivot shaft, said tensioner arm having a cylindrical bearing mounting surface with its axis of rotation located eccentrically with respect to an axis of the pivot shaft, and said tensioner arm having a first stop member;
   a rotatable member rotatably mounted to the cylindrical bearing mounting surface, the rotatable member having an outer surface complementary to the surface of flexible drive means to be contacted by the rotatable member;
   a spring operable to bias the tensioner arm about the pivot shaft to move the rotatable member towards the flexible drive means to tension the flexible drive means; and
   adjustable stop means engaged with a portion of the tensioner and wherein the adjustable stop means receives the first stop member of the tensioner arm and defining an angular range of movement of the tensioner arm during operation, the stop means being moveable by an installer of the tensioner while the portion of the tensioner is fixed in position on the engine, to alter the angular range of movement of the tensioner arm from a position suitable for installation of the flexible drive means about the rotatable member to a position for operation of the installed tensioner.

2. The tensioner of claim 1 wherein the stop means includes indicia to indicate when the stop means is in a predetermined nominal operating position.

3. The tensioner of claim 2 wherein the stop means frictionally engages the portion of the tensioner that is stationary after installation on the engine and the frictional force developed therebetween is sufficient to inhibit movement of the stop means during operation of the engine but can be overcome with mechanical advantage when the tensioner is installed on an engine.

4. The tensioner of claim 3 wherein the stationary portion of the tensioner is the pivot shaft.

5. The tensioner of claim 4 wherein the stationary portion further includes a base configured to orient the tensioner relative to the engine.

6. The tensioner of claim 4 wherein said stop means is configured to receive a tool to provide the mechanical advantage for urging the stop means relative to the stationary portion.

7. The tensioner of claim 1 wherein the stop means frictionally engages a stationary portion of the tensioner and the frictional force developed therebetween is sufficient to inhibit movement of the stop means during operation of the engine but can be overcome with mechanical advantage when the tensioner is installed on an engine.

8. The tensioner of claim 7 wherein the stationary portion of the tensioner is the pivot shaft.

9. The tensioner of claim 8 wherein the stationary portion further includes a base configured to orient the tensioner relative to the engine.

10. The tensioner of claim 9 wherein the stop member comprises a pin and the stop means includes an arcuate slot which receives the pin, the ends of the slot acting as stops against which the pin will abut to limit movement of the tensioner arm.

11. The tensioner of claim 1 wherein the tensioner arm has a second stop member and the stop means includes respective abutment surfaces to engage respective ones of the first stop member and the second stop member to limit movement of the tensioner arm within a desired range of operation.

12. The tensioner of claim 11 wherein the first stop member is a free arm stop and the second stop member is a backstop.

13. The tensioner of claim 12 wherein the stop means frictionally engages a portion of the tensioner that is stationary after installation on the engine and the frictional force developed therebetween is sufficient to inhibit movement of the stop means during operation of the engine but can be overcome with mechanical advantage when the tensioner is installed on an engine.

14. The tensioner of claim 13 wherein the stationary portion of the tensioner is the pivot shaft.

15. The tensioner of claim 14 wherein the stop means further includes a stop plate having an adjustment arm extending therefrom.

16. The tensioner of claim 15 wherein the spring has one end attached to the tensioner arm and the other end attached to the stop means.

17. The tensioner of claim 16 wherein both the tensioner arm and the stop means further include indicias to indicate when the tensioner arm and the stop means have been moved to a nominal operating position.

18. A tensioner for a flexible drive means on an engine, comprising:
- a pivot shaft having a central bore to receive a bolt to install the tensioner to the engine;
- a tensioner arm rotatably mounted on the pivot shaft, said tensioner arm having a cylindrical bearing mounting surface with its axis of rotation located eccentrically with respect to an axis of the pivot shaft;
- a rotatable member rotatably mounted to the cylindrical bearing mounting surface, the rotatable member having an outer surface complementary to the surface of flexible drive means to be contacted by the rotatable member;
- a spring operable to bias the tensioner arm about the pivot shaft to move the rotatable member towards the flexible drive means to tension the flexible drive means; and
- adjustable stop means engaged with a portion of the tensioner and wherein the adjustable stop means defines an angular range of movement of the tensioner arm during operation, the stop means being moveable while the pivot shaft is fixed in position on the engine, to alter the angular range of movement of the tensioner arm from a position suitable for installation of the flexible drive means about the rotatable member to a position for operation of the installed tensioner.

19. A tensioner of claim 18 wherein said spring is operatively coupled with said stop means to move an end of the spring as the stop means is moved by the installer.

20. A tensioner of claim 19 wherein said stop means has indicia to indicate when the stop means is in a nominal operating position after the tensioner is installed on the engine.

* * * * *